United States Patent
Fei

(10) Patent No.: US 11,061,962 B2
(45) Date of Patent: Jul. 13, 2021

(54) RECOMMENDING AND PRESENTING COMMENTS RELATIVE TO VIDEO FRAMES

(71) Applicant: Shanghai Bilibili Technology Co., Ltd., Shanghai (CN)

(72) Inventor: Yongping Fei, Shanghai (CN)

(73) Assignee: Shanghai Bilibili Technology Co., Ltd., Shanghai (CN)

(*) Notice: Subject to any disclaimer, the term of this patent is extended or adjusted under 35 U.S.C. 154(b) by 385 days.

(21) Appl. No.: 16/216,973

(22) Filed: Dec. 11, 2018

(65) Prior Publication Data
US 2019/0179852 A1 Jun. 13, 2019

(30) Foreign Application Priority Data
Dec. 12, 2017 (CN) .......................... 201711326058.5

(51) Int. Cl.
*G06F 16/00* (2019.01)
*G06F 16/735* (2019.01)
(Continued)

(52) U.S. Cl.
CPC .......... *G06F 16/735* (2019.01); *G06F 16/353* (2019.01); *G06F 16/7844* (2019.01); *G06K 9/00744* (2013.01); *H04N 21/4788* (2013.01)

(58) Field of Classification Search
CPC .. G06F 16/735; G06F 16/7844; G06F 16/353; H04N 21/4788; H04N 21/4668; H04N 21/47214; H04N 21/4884; G06K 9/00744; G06K 9/00718; G06K 2209/27; G06K 9/00677
See application file for complete search history.

(56) References Cited

U.S. PATENT DOCUMENTS 7,809,773 B2* 10/2010 Horowitz ........... H04N 21/4788
707/805
8,019,815 B2 9/2011 Keener et al.
(Continued)

FOREIGN PATENT DOCUMENTS

| CN | 104936035 A | 9/2015 |
|---|---|---|
| CN | 105426152 A | 3/2016 |

(Continued)

*Primary Examiner* — Jared M Bibbee
(74) *Attorney, Agent, or Firm* — BakerHostetler

(57) ABSTRACT

Techniques for recommending and presenting comments relative to video frames in a network community are described herein. The disclosed techniques include receiving a request for playing comments relative to frames of a first video from a first user who is watching the first video; classifying comments on the first video that have been received from users into a plurality of classifications of comments based on data associated with the users and a plurality of predetermined rules; reading a plurality of comments from the plurality of classifications of comments based on a plurality of predetermined proportions; generating a plurality of recommended bullet screens comprising the plurality of comments; and transmitting the plurality of recommended bullet screens to the first user, wherein the plurality of comments relative to corresponding frames of the first video are presented to the first user via the plurality of recommended bullet screens.

20 Claims, 7 Drawing Sheets

(51) Int. Cl.
  *G06F 16/783* (2019.01)
  *H04N 21/4788* (2011.01)
  *G06K 9/00* (2006.01)
  *G06F 16/35* (2019.01)

(56) References Cited

U.S. PATENT DOCUMENTS

| | | | |
|---|---|---|---|
| 8,376,910 B2 | 2/2013 | Cheung et al. | |
| 8,545,369 B2 | 10/2013 | Cheung et al. | |
| 8,555,177 B1* | 10/2013 | Junee | H04L 12/1822 |
| | | | 715/751 |
| 8,628,414 B2 | 1/2014 | Walker et al. | |
| 8,701,153 B2 | 4/2014 | Abrams | |
| 9,003,306 B2* | 4/2015 | Mehin | H04L 51/36 |
| | | | 715/758 |
| 9,253,225 B1 | 2/2016 | Junee et al. | |
| 9,332,315 B2 | 5/2016 | Agrawal | |
| 9,467,408 B1* | 10/2016 | Sherman-Presser | |
| | | | H04N 21/654 |
| 9,467,744 B2* | 10/2016 | Zhang | H04N 21/4756 |
| 2006/0101491 A1 | 5/2006 | Tsuruta et al. | |
| 2009/0249223 A1 | 10/2009 | Barsook et al. | |
| 2012/0166931 A1 | 6/2012 | Alonso et al. | |
| 2012/0331496 A1* | 12/2012 | Copertino | H04L 65/4015 |
| | | | 725/14 |
| 2013/0326352 A1* | 12/2013 | Morton | G06F 3/0484 |
| | | | 715/719 |
| 2014/0012910 A1* | 1/2014 | White | H04N 21/2223 |
| | | | 709/204 |
| 2014/0013200 A1* | 1/2014 | White | H04N 21/4788 |
| | | | 715/230 |
| 2014/0081435 A1 | 3/2014 | Wagner | |
| 2014/0089801 A1* | 3/2014 | Agrawal | H04N 21/8547 |
| | | | 715/719 |
| 2014/0092127 A1* | 4/2014 | Kruglick | G06F 21/84 |
| | | | 345/629 |
| 2015/0082342 A1* | 3/2015 | Norwood | G06F 16/958 |
| | | | 725/32 |
| 2015/0261853 A1* | 9/2015 | Shao | G06F 16/248 |
| | | | 707/722 |
| 2016/0316272 A1 | 10/2016 | Li | |
| 2016/0342287 A1* | 11/2016 | Barker | G06F 3/0482 |
| 2018/0032898 A1* | 2/2018 | Wu | G06N 20/00 |

FOREIGN PATENT DOCUMENTS

| | | |
|---|---|---|
| CN | 105516821 A | 4/2016 |
| CN | 105872593 A | 8/2016 |
| CN | 105916057 A | 8/2016 |
| CN | 106028161 A | 10/2016 |
| KR | 2005-0004210 A | 1/2005 |

\* cited by examiner

RECOMMENDING AND PRESENTING COMMENTS RELATIVE TO VIDEO FRAMES

CROSS-REFERENCE TO RELATED APPLICATION

The present application claims priority of Chinese patent application No. 201711326058.5, filed on Dec. 12, 2017. The entire disclosure of the above-identified application is hereby incorporated by reference herein and made a part of this specification.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
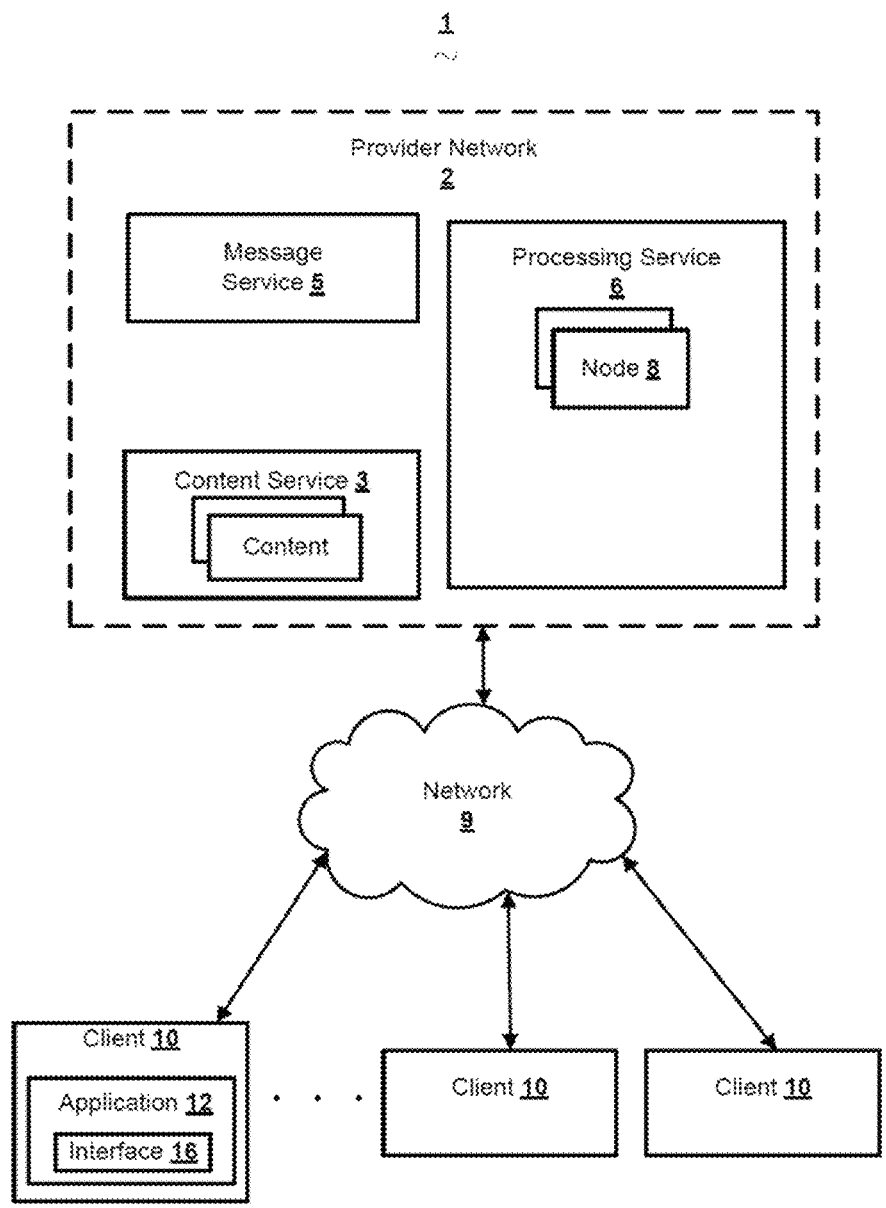
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screens."

The provider network 2 may be located at a data center, such as a single premise, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2.

The application 12 may also send events to a processing service. As an example, the application 12 may send reports against certain users to a processing service, and the application 12 may also send reviews about the reports to the processing service. The events or reviews sent from the plurality of client computing devices comprise reasons of submitting the events, content attributes associated with the events, user account information, and/or the like. The techniques for processing events and evaluating performance of a plurality of user accounts in accordance with the present disclosure can be implemented by the example system as shown in FIG. 1.

Figure 2:
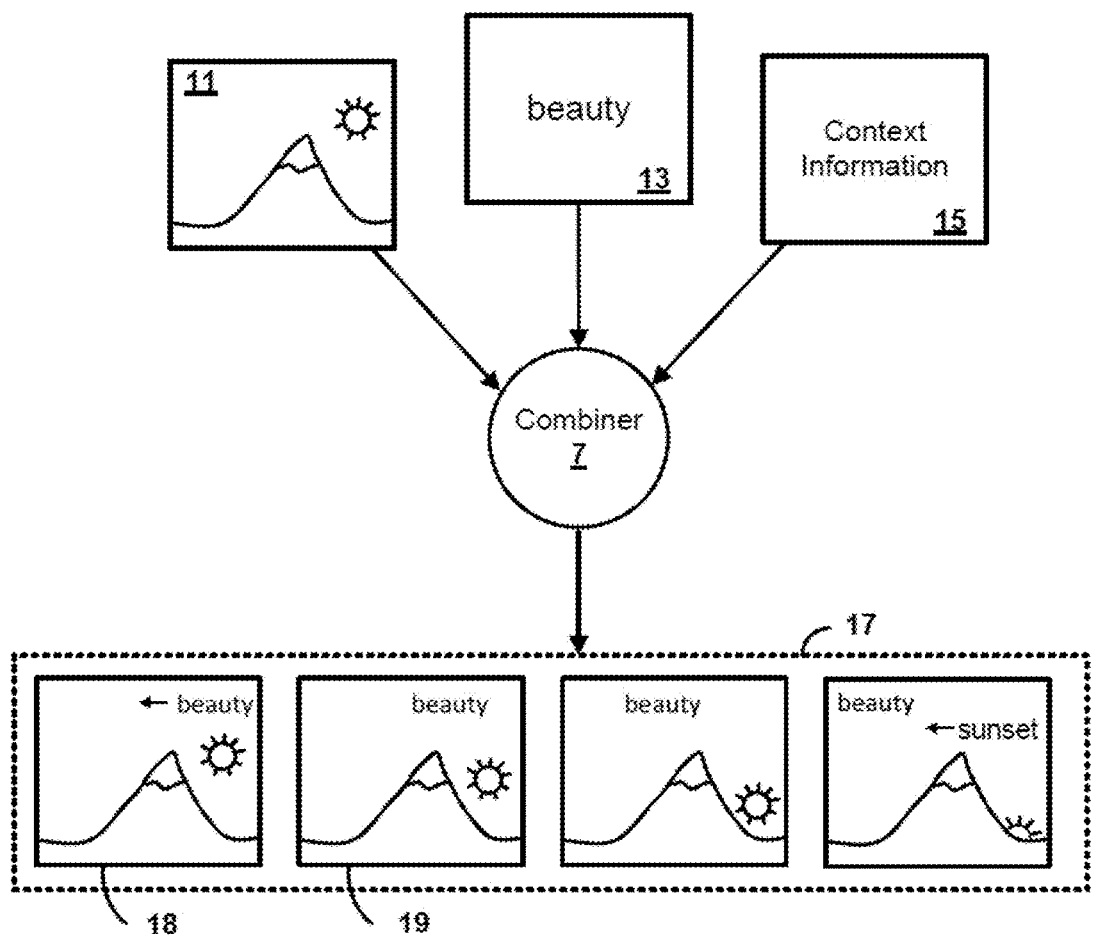
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame may be ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character 美 is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "E r" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
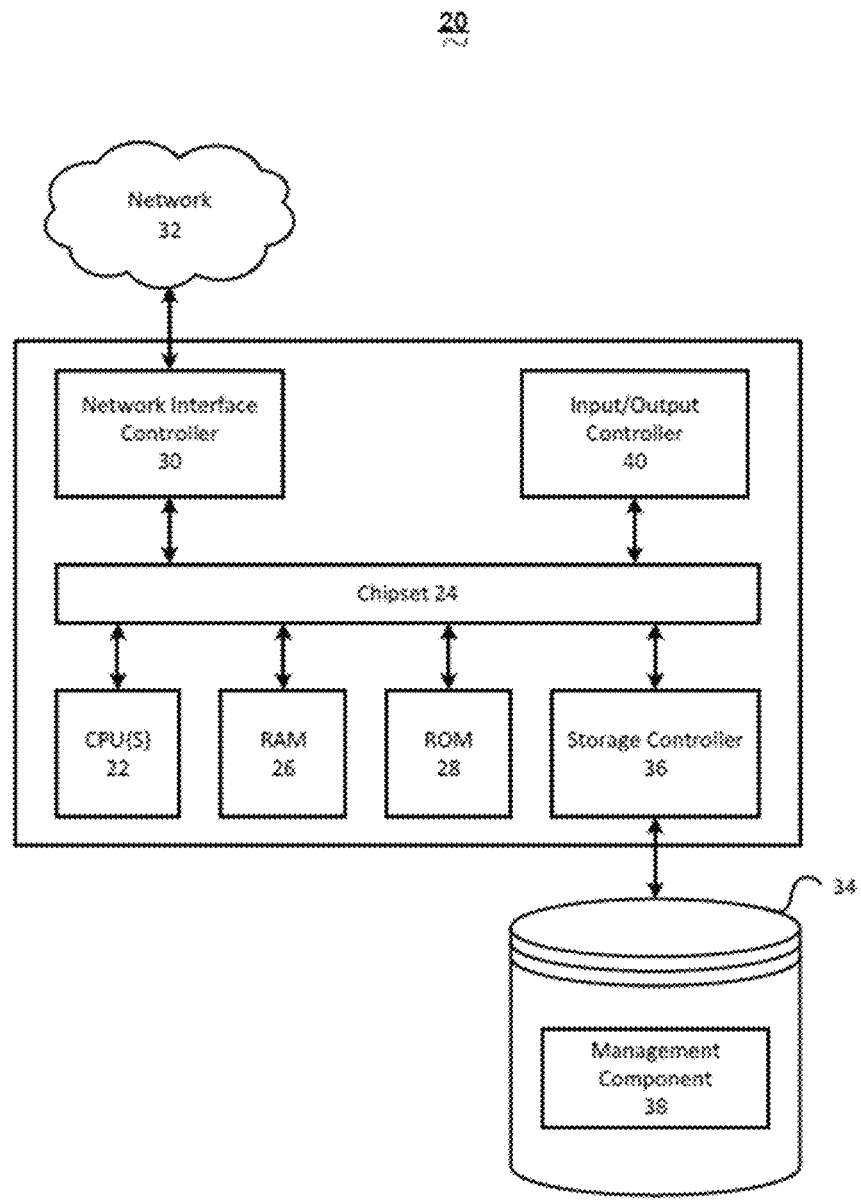
FIG. 3 is a schematic diagram illustrating an example computing device that may be used in accordance with the present disclosure.

FIG. 3 depicts a computing device that may be used in various aspects, such as the services, networks, and/or clients depicted in FIG. 1. With regard to the example architecture of FIG. 1, the message service, content service, processing service, provider network, and client may each be implemented by one or more an instances of a computing device 20 of FIG. 3. The computer architecture shown in FIG. 3 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 3, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 3, may also include an input/output controller 40 for receiving and processing input from a number of input devices, such as a keyboard, a mouse, a touchpad, a touch screen, an electronic stylus, or other type of input device. Similarly, an input/output controller 40 may provide output to a display, such as a computer monitor, a flat-panel display, a digital projector, a printer, a plotter, or other type of output device. It will be appreciated that the computing device 20 may not include all of the components shown in FIG. 3, may include other components that are not explicitly shown in FIG. 3, or may utilize an architecture completely different than that shown in FIG. 3.

As described herein, a computing device may be a physical computing device, such as the computing device 20 of FIG. 3. A computing node may also include a virtual machine host process and one or more virtual machine instances. Computer-executable instructions may be executed by the physical hardware of a computing device indirectly through interpretation and/or execution of instructions stored and executed in the context of a virtual machine.

Figure 4:
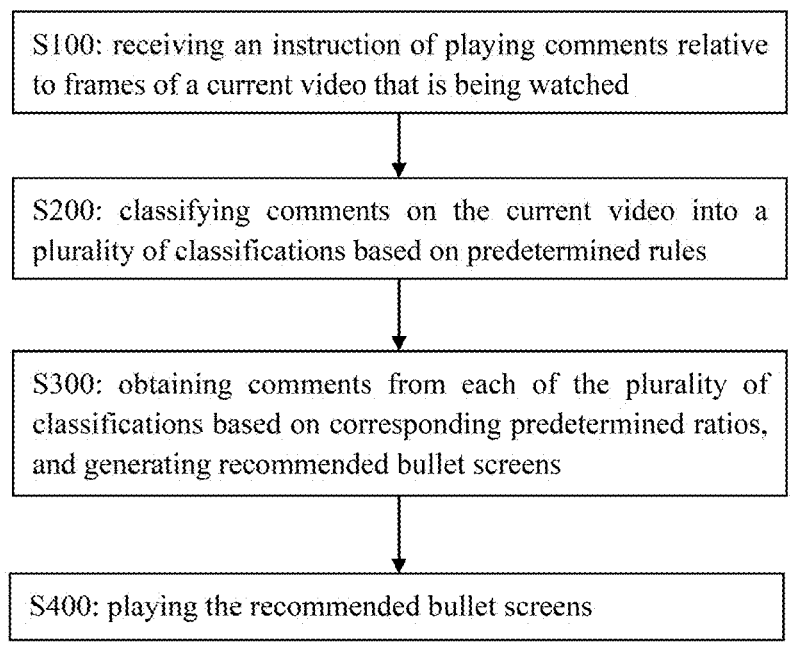
FIG. 4 is a flowchart illustrating an example process of an embodiment of the present disclosure.

FIG. 4 is a flowchart of an embodiment of the bullet screen playing control method of the present invention, in this embodiment, the bullet screen playing control method comprises the following steps:

S100: receiving an instruction of playing comments relative to frames of a current video that is currently being watched;

When a user watches a current video on a video website, if the user needs the current video to open the bullet screen function to play the bullet screen text, the user can send an instruction of playing the bullet screen of the current video to the interactive interface of the video website to control the video website to play the bullet screen text of the current video. Therefore, in this invention, the playing way of bullet screen is usually performed through a single request of the user. According to the instruction of playing the bullet screen of the user, after the server of the video website receives the instruction, the server will play the bullet screen text of the current video for the user according to the instruction of playing the bullet screen received.

S200: classifying comments on the current video into a plurality of classifications based on predetermined rules;

When the server of the video website receives the instruction of playing the bullet screen sent by the user, the operator will classify the existing default bullet screen text in the current video before playing the bullet screen text. The classification is based on historical data information related to the user stored in the video website, the server of the video website presets classes to the user's viewing habits and preferences according to the historical data information, then, performs the classification operation to the existing default bullet screen text in the current video according to the preset classes.

In a preferred embodiment, the preset classes are configured to classify the default bullet screen text based on the preferences of the current user of the current video played and/or preset rules.

In a preferred embodiment, the video website can pre-configure the preset classes according to the preferences of the current user, and classify the default bullet screen text of the current video according to the preset classes, so as to help the current user to remove selectively some bullet screen text content that is not corresponding to the requirements of the current user before the bullet screen text is played, to ensure that the bullet screen content that the current user will see is in line with his personal viewing preferences and is easy to resonate. Wherein, the specific preferences include: the habit of watching the video, the type of the video watched, the type of the historical bullet screen liked, the concerned object, etc. On the other hand, in order to achieve the purpose of optimizing the default bullet screen text, the video website also can preset classification rules to classify the default bullet screen text. The specific rules can include, but are not limited to, the popularity, the keyword, the time sequence, etc. of the default bullet screen text, the specific rules can be set according to the default configuration of the video website, and can be manually adjusted according to the different requirements of the current user, so as to further optimize the existing default bullet screen text for the current user and provide bullet screen content that is more in line with the requirements of the current user.

In a preferred embodiment, the preset classes include: the first class, the second class, the third class, the fourth class and the fifth class;

the first class is, in the default bullet careen text, the first class bullet screen text formed by the historical bullet screen text with interactive operations in the current video;

the second class is, in the default bullet careen text, the second class bullet screen text with the top $n_1$% of the operation numbers of the interactive operations;

the third class is, in the default bullet careen text, the third class bullet screen text sent by at least one concerned object selected by the current user;

the fourth class is, in the default bullet careen text, the fourth class bullet screen text sent by a similar user whose ratio of overlapping the historical videos of the current user within a preset period is more than $n_2$%;

the fifth class is, in the default bullet careen text, the fifth class bullet screen text sent by more than $n_3$% of other users in the video type of the current video that is concerned and/or collected;

wherein, the interactive operations include one or more of giving likes, replying, selecting all and copying;

the $n_1$%, the $n_2$% and the $n_3$% are greater than 0%, and less than or equal to 100%.

In a preferred embodiment, the video website can classify the default bullet screen text into five classes according to the user's viewing habits and preferences.

The first class bullet screen text is formed by the historical bullet screen text with the interactive operations in the current video. Specifically, for example, the server of the video website can extract the historical bullet screen text and comment content to which the user once performed the operations of giving likes, replying, selecting all, copying, etc., trace the author of the historical bullet screen text and comment content, and further extract the first class bullet screen text sent by the author from the default bullet screen text in the current video.

The second class bullet screen text is in the default bullet careen text, the bullet screen content with the top $n_1$% of the operation numbers of the interactive operations. Specifically, for example, the server of the video website makes statistics on the operation numbers of the interactive operations of giving likes, replying, selecting all, copying, etc., in all default bullet screen text in the current video, and extracts the default bullet screen text with the top 10% of the operation numbers as the second class bullet screen text, that is, extracts the bullet screen text with the top 10% of the highest popularity from the default bullet screen text as the second class bullet screen text. It can be understood that the value of $n_1$% includes, but is not limited to, 10% defined in this embodiment, and the specific value can be set or adjusted according to the actual requirements of the user.

The third class bullet screen text is, in the default bullet careen text, the bullet screen content sent by at least one concerned object selected by the current user. Specifically, for example, the server of the video website traces the data of each of the concerned objects contained in the current user's watchlist and traces the bullet screen content sent by the each of the concerned objects to the current video as the third class bullet screen text.

The fourth class bullet screen text is, in the default bullet careen text, the bullet screen content sent by a similar user whose ratio of overlapping the historical videos of the current user within a preset period is more than $n_2$%. Specifically, for example, the server of the video website, based on the internal statistics, finds that there is one or some users, whose ratio of overlapping the historical videos of the current user within a week is more than 50%, then judges that the one or some users are the user or users similar to the current user, that is, considers that the video viewing preferences of the similar user or users are close to those of the current user. Therefore, the server of the video website will extract the bullet screen content sent by the similar user or users to the current video as the fourth class bullet screen text. It can be understood that the value of $n_2$% includes, but is not limited to, 50% defined in this embodiment, and the specific value can be set or adjusted according to the actual requirements of the user.

The fifth class bullet screen text is, in the default bullet careen text, the bullet screen content sent by more than $n_3$% of other users in the video type of the current video that is concerned and/or collected. Specifically, for example, the server of the video website will make statistics on the grouped video content concerned and/or collected by each user, if the grouped video content to which the current video belongs is "life—funny", the server of the video website will make statistics on the video content in "life—funny" concerned and/or collected by each user. If the video content in "life—funny" concerned and/or collected by one or some users is more than 75%, the server of the video website will extract the bullet screen content sent by the one or some users in the current video as the fifth class bullet screen text. It can be understood that the value of $n_3$% includes, but is not limited to, 75% defined in this embodiment, and the specific value can be set or adjusted according to the actual requirements of the user.

It can be understood that, the first class bullet screen text, the second class bullet screen text, the third class bullet screen text, the fourth class bullet screen text, and the fifth class bullet screen text in the present embodiment are purely used to classify the existing default bullet screen text in the current video, and do not have any directionality of proportion or importance. Moreover, the number of the preset classes can also include, but is not limited to, five, which can be set or adjusted according to the actual requirements of the user.

S300: obtaining comments from each of the plurality of classifications based on corresponding predetermined ratios, and generating recommended bullet screens comprising recommended bullet screen text;

The server of the video website presets a preset extraction ratio for the default bullet screen text of each preset class, extracts the bullet screen content of the first class bullet screen text, the second class bullet screen text, the third class bullet screen text, the fourth class bullet screen text, the fifth class bullet screen text respectively according to each preset extraction ratio, and combines the bullet screen content extracted to form recommended bullet screen text. For each preset extraction ratio is set based on the user's viewing habits and preferences, the recommended bullet screen text is easier to be accepted by the current user, compared with the default bullet screen text of the current video, and the recommended bullet screen text is more in line with the current user's own personality.

S400: playing the recommended bullet screens.

When the server of the video website extracts the bullet screen content in each preset class according to each preset ratio and forms the recommended bullet screen text that is in line with the current user's viewing habits and preferences, it will play the recommended bullet screen text according the instruction of playing the bullet screen text sent previously by the current user.

Figure 5:
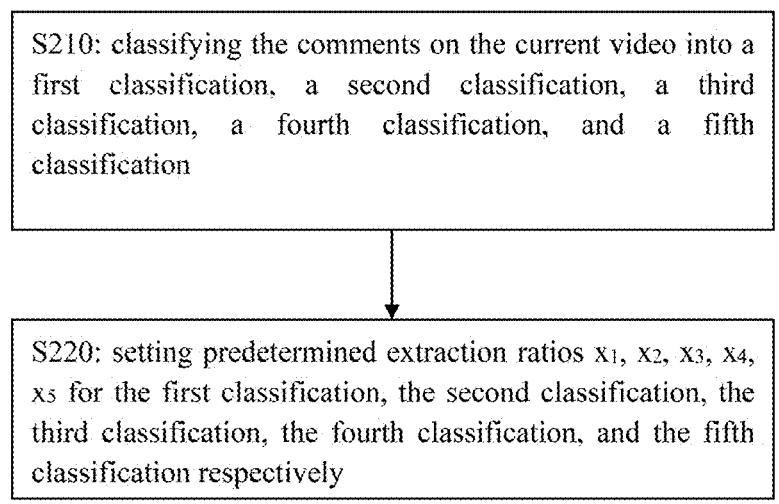
FIG. 5 is a flowchart illustrating an example process of the step S200 that may be used in accordance with the present disclosure.

Please refer to FIG. 5, in one embodiment, the step of classifying comments on the current video into a plurality of classifications based on predetermined rules can be carried out according to the following steps:

S210: classifying the comments on the current video into a first classification, a second classification, a third classification, a fourth classification, and a fifth classification;

S220: setting predetermined extraction ratios $x_1$, $x_2$, $x_3$, $x_4$, $x_5$ for the first classification, the second classification, the third classification, the fourth classification, and the fifth classification respectively;

wherein, $x_1$, $x_2$, $x_3$, $x_4$, $x_5$ are all greater than or equal to 0.

The server of the video website obtains the current user's viewing habits and interests based on historical data information. In this embodiment, the server of the video website classifies the default bullet screen text of the current video into five classes according to the user's viewing habits and interests. After the classification, in order to ensure that the recommended bullet screen text sent is more in line with the current user's own personality, the server of the video website further set the extraction ratios $x_1$, $x_2$, $x_3$, $x_4$, $x_5$ for the five classes respectively. The user can set and adjust the preset extraction ratios according to his own requirements, therefore, the recommended bullet screen text formed by the server of the video website is more in line with the actual requirements of the user, the viewing experience of the bullet screen obtained by the current user is more optimized. Furthermore, for the five classes do not have any directionality of proportion or importance, the values of $x_1$, $x_2$, $x_3$, $x_4$, $x_5$ can be the same or different, and there is no necessary connection between the values of $x_1$, $x_2$, $x_3$, $x_4$, $x_5$. In addition, the sum of $x_1$, $x_2$, $x_3$, $x_4$, $x_5$ can be equal to 1 or less than 1. When the sum of $x_1$, $x_2$, $x_3$, $x_4$, $x_5$ is less than 1, for example, the sum of $x_1$, $x_2$, $x_3$, $x_4$, $x_5$ is 0.8, then the actual bullet screen content that the server of the video website eventually plays to the user is composed of 0.8 of the recommended text +0.2 of the default bullet screen text.

Figure 6:
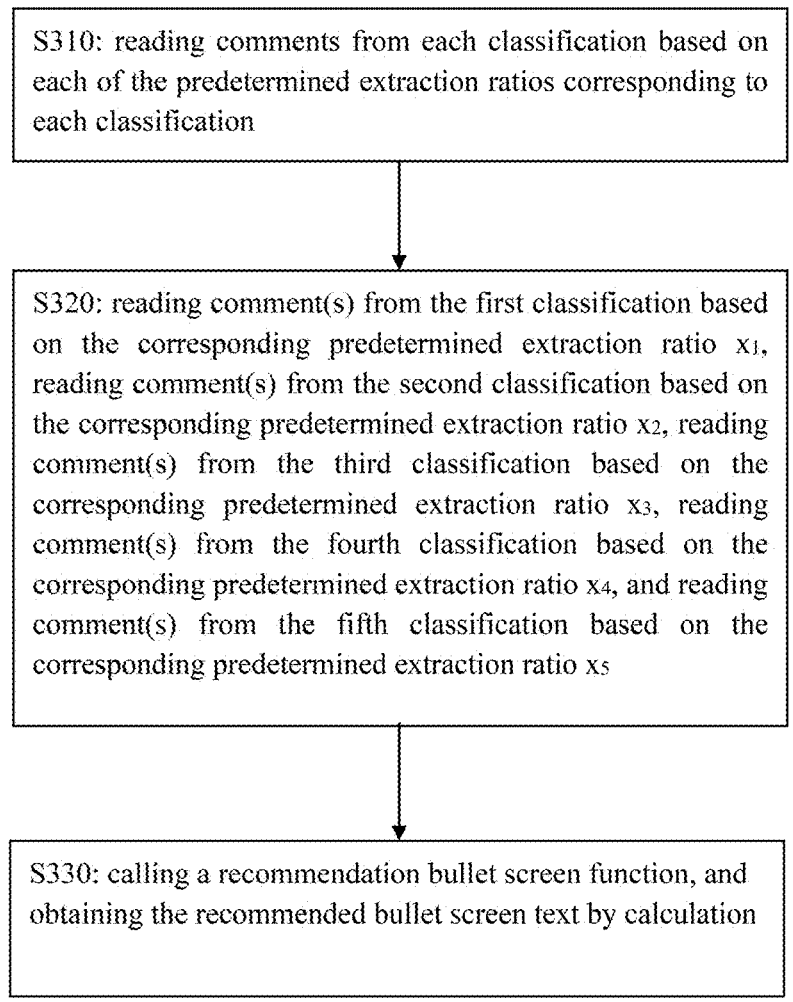
FIG. 6 is a flowchart illustrating an example process of the step S300 that may be used in accordance with the present disclosure.

Please refer to FIG. 6, in one embodiment, the step of obtaining comments from each of the plurality of classifications based on corresponding predetermined proportions and forming recommended bullet screens can be carried out according to the following steps:

S310: reading comments from each classification based on each of the predetermined extraction proportions corresponding to each classification;

S320: extracting the first class bullet screen text from the first classification based on corresponding ratio $x_1$, the second class bullet screen text from the second classification based on corresponding ratio $x_2$, the third class bullet screen text from the third classification based on corresponding ratio $x_3$, the fourth class bullet screen text from the fourth classification based on corresponding ratio $x_4$, and the fifth class bullet screen text from the fifth classification based on corresponding ratio $x_5$;

S330: calling a recommended bullet screen function, and obtaining the recommended bullet screen text by calculation.

After the server of the video website classifies the default bullet screen text of the current video, it further reads each of the preset extraction ratios corresponding to each of the preset classes, extracts the bullet screen content in each class according to the each of the preset extraction ratios, calls the recommended bullet screen function, and obtains the final recommended bullet screen text by intelligent calculation. The current user can further set or adjust the preset classes and the corresponding extraction ratios, so as to ensure that the recommended bullet screen text is formed according to the extraction ratios set by the user or the default extraction ratios, thus making the recommended bullet screen text formed more personalized.

Figure 7:
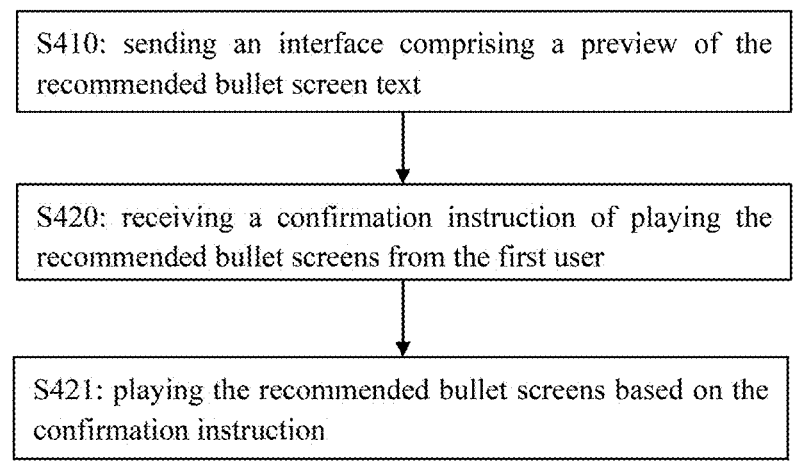
FIG. 7 is a flowchart illustrating an example process of the step S400 that may be used in accordance with the present disclosure.

Please refer to FIG. 7, in one embodiment, the step of playing the recommended bullet screens can be carried out according to the following steps:

S410: sending an interface comprising a preview of the recommended bullet screen text.

S420: receiving a confirmation instruction of playing the recommended bullet screens from the current user;

S421: playing the recommended bullet screens according to the confirmation instruction.

In this embodiment, the server of the video website will send in advance a reminder of playing the recommended bullet screen text to the current user, before sending the recommended bullet screen text, and the current user can select playing the recommended bullet screen text or playing the default bullet screen text. After receiving the instruction of playing the recommended bullet screen text confirmed by the current user, the server of the video website will play the recommended bullet screen text to the current user.

In a preferred embodiment, the step of sending an interface comprising a preview of the recommended bullet screen text can be carried out according to the following steps:

S411: displaying the preview text of the recommended bullet screen text;

S412: showing a selection window that allows the current user to select a recommendation level among a plurality of recommendation levels;

S413: determining a proportion of recommended bullet screens to be displayed in a total number of bullet screens to be displayed based on the recommendation level selected by the current user;

S414: playing the recommended bullet screens according to the determined proportion.

In order to ensure that the user can enjoy more optimized bullet screen experience, in the present embodiment, the step of the server of the website sending a reminder of playing the recommended bullet screen text to the current user further includes displaying the preview text of the recommended bullet screen text, so as to better help the current user to determine whether the recommended bullet screen text needs to be played or not. When the current user determines that the recommended bullet screen text needs to be played, the server of the video website further provides a recommended level selection window to the current user, and the current user can further adjust the proportion of the recommended bullet screen text in the bullet screen content that will be played actually through the recommended level selection window. When the user selects the recommended level, the server of the video website plays the recommended bullet screen text according to the playing proportion corresponding to the recommended level.

In a preferred embodiment, the recommended level is the playing proportion of the recommended bullet screen text to the default bullet screen text, and is adjusted according to the behavior record of the current user.

In a preferred embodiment, the current user can select playing the recommended bullet screen text or playing the default bullet screen text. After receiving the instruction of playing the recommended bullet screen text confirmed by the current user, the server of the video website further provides a recommended level selection window to the current user. The recommended level in the selection window is the playing proportion of the recommended bullet screen text optimized by the server in the bullet screen content that will be played to the default bullet screen text of the current video. The current user can further adjust the proportion of the recommended bullet screen text in the bullet screen content that will be played actually through the recommended level selection window, and the basis of the server of the video website setting the recommended level is the user's previous bullet screen behavior record, but in order to prevent the recommendation of the bullet screen from fully referring to the user's bullet screen behavior record to enter into a cycle, the recommended level is set to ensure that the user can receive unseen bullet screen comments, the proportional interval received can be set according to the divided levels. Then the current user can further interact with the newly penetrated bullet screen, to collect more behavior data of the user, and then optimize the setting of the preset classes.

In a preferred embodiment, the recommended levels include: the first level, the second level, the third level and the fourth level;

the playing proportion corresponding to the first level is 40%;

the playing proportion corresponding to the second level is 60%;

the playing proportion corresponding to the third level is 80%;

the playing proportion corresponding to the fourth level is 100%.

Based on the above-mentioned recommended levels, the server of the video website can adjust the proportion of the recommended bullet screen text in the bullet screen content that will be played actually according to the current user's selection. When the user selects the first level, the server of the video website determines the proportion of playing the recommended bullet screen text to be 40% according to the first level. At this time, the server of the video website will automatically play 40% of the recommended bullet screen text and 60% of the default bullet screen text, thus further optimizing the bullet screen content played actually.

The present invention also discloses a server, in which is stored a computer program that is executed by a processor to carry out the steps introduced in the above-mentioned embodiments, therefore it won't be reiterated here additionally.

In addition, the following steps can be carried out according to the features of the server and the current user terminal when the bullet screen playing control system constructed based on the server and the current user terminal is applied.

the server receiving an instruction of playing the bullet screen of the current video sent by the current user terminal;

the server classifying the default bullet screen text of the current video according to preset classes;

the server extracting the default bullet screen text in each of the preset classes respectively according to preset extraction ratios, and forming recommended bullet screen text;

the server playing the recommended bullet screen text to the current user terminal.

Preferably, the preset classes are configured that the server classifies the default bullet screen text based on the preferences of the current user of the current video played and/or preset rules.

Preferably, the preset classes include: the first class, the second class, the third class, the fourth class and the fifth class;

the first class is, in the default bullet careen text, the first class bullet screen text formed by the historical bullet screen text with interactive operations in the current video;

the second class is, in the default bullet careen text, the second class bullet screen text with the top $n_1$% of the operation numbers of the interactive operations;

the third class is, in the default bullet careen text, the third class bullet screen text sent by at least one concerned object selected by the current user;

the fourth class is, in the default bullet careen text, the fourth class bullet screen text sent by a similar user whose ratio of overlapping the historical videos of the current user within a preset period is more than $n_2$%;

the fifth class is, in the default bullet careen text, the fifth class bullet screen text sent by more than $n_3$% other users in the video type of the current video that is concerned and/or collected;

wherein, the interactive operations include one or more of giving likes, replying, selecting all and copying;

the $n_1$%, the $n_2$% and the $n_3$% are greater than 0%, and less than or equal to 100%.

Preferably, the step of the server classifying the default bullet screen text of the current video according to preset classes includes:

the server classifying the default bullet screen text into the first class bullet screen text, the second class bullet screen text, the third class bullet screen text, the fourth class bullet screen text and the fifth class bullet screen text;

the server setting preset extraction ratios $x_1$, $x_2$, $x_3$, $x_4$, $x_5$ for the first class, the second class, the third class, the fourth class and the fifth class respectively;

wherein, $x_1$, $x_2$, $x_3$, $x_4$, $x_5$ are all greater than or equal to 0.

Preferably, the step of the server extracting the default bullet screen text in each of the preset classes respectively according to preset extraction ratios, and forming recommended bullet screen text includes:

the server reading each of the preset extraction ratios corresponding to each of the preset classes;

the server extracting the first class bullet screen text corresponding to $x_1$ in the first class, the second class bullet screen text corresponding to $x_2$ in the second class, the third class bullet screen text corresponding to $x_3$ in the third class, the fourth class bullet screen text corresponding to $x_4$ in the fourth class, and the fifth class bullet screen text corresponding to $x_5$ in the fifth class;

the server calling a recommended bullet screen function, and obtaining the recommended bullet screen text by calculation.

Preferably, the step of the server playing the recommended bullet screen text to the current user terminal includes:

the server sending a reminder of playing the recommended bullet screen text to the current user terminal;

the server receiving the playing confirmation instruction of the current user terminal; the server playing the recommended bullet screen text to the current user terminal according to the playing confirmation instruction.

Preferably, the step of the server sending a reminder of playing the recommended bullet screen text to the current user terminal includes:

the server displaying the preview text of the recommended bullet screen text;

the server showing a pop-up selection window that includes the recommended levels of the recommended bullet screen text;

the server determining the playing proportion of playing the recommended bullet screen text corresponding to the recommended level according to the recommended level selected by the current user terminal;

the server playing the recommended bullet screen text to the current user terminal according to the playing proportion.

Preferably, the recommended level is the playing proportion of the recommended bullet screen text to the default bullet screen text, and is adjusted by the server according to the behavior record of the current user.

Preferably, the recommended levels include: the first level, the second level, the third level and the fourth level;

the playing proportion corresponding to the first level is 40%;

the playing proportion corresponding to the second level is 60%;

the playing proportion corresponding to the third level is 80%;

the playing proportion corresponding to the fourth level is 100%.

Hereinafter, the application of the present invention will be introduced in details by referring to the specific embodiments.

Embodiment 1

When a user watches a current video on a video website, if the user needs the current video to open the bullet screen function to play the bullet screen text, the user can send to the server of the video website an instruction of solely controlling the current video to play the bullet screen through the interactive interface of the video website. When the server of the video website receives the instruction of playing the bullet screen sent by the user, the server will classify the existing default bullet screen text in the current video before playing the bullet screen text. First, the server pre-configures the preset classes according to the preferences of the current user, then classifies the default bullet screen text of the current video according to the preset classes. Therefore, the server of the video website can help the current user to remove selectively some bullet screen text content that is not corresponding to the requirements of the current user before the bullet screen text is played, to ensure that the bullet screen content that the current user will see is in line with his personal viewing preferences and is easy to resonate. Wherein, the bases of configuring the preset classes can include, but are not limited to, the habit of watching the video, the type of the video watched, the type of the historical bullet screen liked, the concerned object, etc., of the current user. On the other hand, in order to achieve the purpose of optimizing the default bullet screen text, the server of the video website also can further preset classification rules to classify the default bullet screen text. The specific rules can include, but are not limited to the popularity, the keyword, the time sequence, etc. of the default bullet screen text. Furthermore, the specific rules can be set according to the default configuration of the video website, and can be manually adjusted according to the different requirements of the current user, so as to further optimize the existing default bullet screen text for the current user and provide bullet screen content that is more in line with the requirements of the current user.

In this embodiment, the server of the video website pre-configures the preset classes according to the preferences of the current user. Specifically, the preset classes include, but are not limited to, the first class, the second class, the third class, the fourth class and the fifth class. According to the five preset classes, the video website classifies the default bullet screen text into the first class bullet screen text, the second class bullet screen text, the third class bullet screen text, the fourth class bullet screen text and the fifth class bullet screen text according to the user's viewing habits and preferences.

The first class bullet screen text is formed by the historical bullet screen text with the interactive operations in the current video. Specifically, the server of the video website can extract the historical bullet screen text and comment content to which the user once performed the operations of giving likes, replying, selecting all, copying, etc., trace the author of the historical bullet screen text and comment content, and further extract the first class bullet screen text sent by the author from the default bullet screen text in the current video.

The second class bullet screen text is, in the default bullet careen text, the bullet screen content with the top 10% of the operation numbers of the interactive operations. Specifically, the server of the video website makes statistics on the operation numbers of the interactive operations of giving likes, replying, selecting all, copying, etc. in all default bullet screen text in the current video, and extracts the default bullet screen text with the top 10% of the operation numbers as the second class bullet screen text, that is, extracts the bullet screen text with the top 10% of the highest popularity from the default bullet screen text as the second class bullet screen text.

The third class bullet screen text is, in the default bullet careen text, the bullet screen content sent by at least one concerned object selected by the current user. Specifically, the server of the video website traces the data of each of the concerned objects contained in the current user's watchlist and traces the bullet screen content sent by the each of the concerned objects to the current video as the third class bullet screen text.

The fourth class bullet screen text is, in the default bullet careen text, the bullet screen content sent by a similar user whose ratio of overlapping the historical videos of the current user within a preset period is more than 50%. Specifically, the server of the video website, based on the internal statistics, finds that there is one or some users, whose ratio of overlapping the historical videos of the current user within a week is more than 50%, then judges that the one or some users are the user or users similar to the current user, that is, considers that the video viewing preferences of the similar user or users are close to those of the current user. Therefore, the server of the video website will extract the bullet screen content sent by the similar user or users to the current video as the fourth class bullet screen text.

The fifth class bullet screen text is, in the default bullet careen text, the bullet screen content sent by more than 75% of other users in the video type of the current video that is concerned and/or collected. Specifically, the server of the video website will make statistics on the grouped video content concerned and/or collected by each user, if the grouped video content to which the current video belongs is "life—funny", the server of the video website will make statistics on the video content in "life—funny" concerned and/or collected by each user. If the video content in "life—funny" concerned and/or collected by one or some users is more than 75%, the server of the video website will extract the bullet screen content sent by the one or some users in the current video as the fifth class bullet screen text.

Further, the server of the video website sets a corresponding preset extraction ratio for the first class bullet screen text, the second class bullet screen text, the third class bullet screen text, the fourth class bullet screen text and the fifth class bullet screen text respectively. In this embodiment, the preset extraction ratio of the first class bullet screen text is 0.5, the preset extraction ratio of the second class bullet screen text is 0.2, and the preset extraction ratios of the third class bullet screen text, the fourth class bullet screen text, and the fifth class bullet screen text are 0.1. The server of the video website reads each preset extraction ratio, and extracts the bullet screen content of the first class bullet screen text, the second class bullet screen text, the third class bullet screen text, the fourth class bullet screen text, the fifth class bullet screen text respectively according to each preset extraction ratio, and then calls the recommended bullet screen function after the extraction, and combines the bullet screen content extracted to form recommended bullet screen text through calculation, that is, the recommended bullet screen text=0.5*the first class bullet screen text+0.2*the second class bullet screen text+0.1*(the third class bullet screen text+the fourth class bullet screen text+the fifth class bullet screen text). For the five classes and the extraction ratios are set based on the current user's viewing habits and preferences, and can be further adjusted and set by the current user according to the actual requirements, therefore, the recommended bullet screen text is easier to be accepted by the current user, compared with the default bullet screen text of the current video, and the recommended bullet screen text is more in line with the current user's own personality.

When the server of the video website extracts the bullet screen content in each preset class according to each preset ratio and forms the recommended bullet screen text that is in line with the current user's viewing habits and preferences, it will play the recommended bullet screen text according the instruction of playing the bullet screen text sent previously by the current user.

Embodiment 2

When a user watches a current video on a video website, if the user needs the current video to open the bullet screen function to play the bullet screen text, the user can send to the server of the video website an instruction of solely controlling the current video to play the bullet screen through the interactive interface of the video website. When the server of the video website receives the instruction of playing the bullet screen sent by the user, the server will classify the existing default bullet screen text in the current video before playing the bullet screen text.

First, the server pre-configures the preset classes according to the preferences of the current user, then classifies the default bullet screen text of the current video according to the preset classes. Therefore, the server of the video website can help the current user to remove selectively some bullet screen text content that is not corresponding to the requirements of the current user before the bullet screen text is played, to ensure that the bullet screen content that the current user will see is in line with his personal viewing preferences and is easy to resonate. Wherein, the bases of configuring the preset classes can include, but are not limited to, the habit of watching the video, the type of the video watched, the type of the historical bullet screen liked, the concerned object, etc. of the current user. On the other hand, in order to achieve the purpose of optimizing the default bullet screen text, the server of the video website also can further preset classification rules to classify the default bullet screen text. The specific rules can include, but are not limited to the popularity, the keyword, the time sequence, etc., of the default bullet screen text. Furthermore, the specific rules can be set according to the default configuration of the video website, and can be manually adjusted according to the different requirements of the current user, so as to further optimize the existing default bullet screen text for the current user and provide bullet screen content that is more in line with the requirements of the current user.

In this embodiment, the server of the video website pre-configures the preset classes according to the preferences of the current user. Specifically, the preset classes include, but are not limited to, the first class, the second class, the third class, the fourth class and the fifth class. According to the five preset classes, the video website classifies the default bullet screen text into the first class bullet screen text, the second class bullet screen text, the third class bullet screen text, the fourth class bullet screen text and the fifth class bullet screen text according to the user's viewing habits and preferences.

The first class bullet screen text is formed by the historical bullet screen text with the interactive operations in the current video. Specifically, the server of the video website can extract the historical bullet screen text and comment content to which the user once performed the operations of giving likes, replying, selecting all, copying, etc., trace the author of the historical bullet screen text and comment content, and further extract the first class bullet screen text sent by the author from the default bullet screen text in the current video.

The second class bullet screen text is, in the default bullet careen text, the bullet screen content with the top 10% of the operation numbers of the interactive operations. Specifically, the server of the video website makes statistics on the operation numbers of the interactive operations of giving likes, replying, selecting all, copying, etc. in all default bullet screen text in the current video, and extracts the default bullet screen text with the top 10% of the operation numbers as the second class bullet screen text, that is, extracts the bullet screen text with the top 10% of the highest popularity from the default bullet screen text as the second class bullet screen text.

The third class bullet screen text is, in the default bullet careen text, the bullet screen content sent by at least one concerned object selected by the current user. Specifically, the server of the video website traces the data of each of the concerned objects contained in the current user's watchlist and traces the bullet screen content sent by the each of the concerned objects to the current video as the third class bullet screen text.

The fourth class bullet screen text is, in the default bullet careen text, the bullet screen content sent by a similar user whose ratio of overlapping the historical videos of the current user within a preset period is more than 50%. Specifically, the server of the video website, based on the internal statistics, finds that there is one or some users, whose ratio of overlapping the historical videos of the current user within a week is more than 50%, then judges that the one or some users are the user or users similar to the current user, that is, considers that the video viewing preferences of the similar user or users are close to those of the current user. Therefore, the server of the video website will extract the bullet screen content sent by the similar user or users to the current video as the fourth class bullet screen text.

The fifth class bullet screen text is, in the default bullet careen text, the bullet screen content sent by more than 75% of other users in the video type of the current video that is concerned and/or collected. Specifically, the server of the video website will make statistics on the grouped video content concerned and/or collected by each user, if the grouped video content to which the current video belongs is "life—funny", the server of the video website will make statistics on the video content in "life—funny" concerned and/or collected by each user. If the video content in "life—funny" concerned and/or collected by one or some users is more than 75%, the server of the video website will extract the bullet screen content sent by the one or some users in the current video as the fifth class bullet screen text.

Further, the server of the video website sets a corresponding preset extraction ratio for the first class bullet screen text, the second class bullet screen text, the third class bullet screen text, the fourth class bullet screen text and the fifth class bullet screen text respectively. In this embodiment, the preset extraction ratio of the first class bullet screen text is 0.5, the preset extraction ratio of the second class bullet screen text is 0.2, and the preset extraction ratios of the third class bullet screen text, the fourth class bullet screen text, and the fifth class bullet screen text are 0.1. The server of the video website reads each preset extraction ratio, and extracts the bullet screen content of the first class bullet screen text, the second class bullet screen text, the third class bullet screen text, the fourth class bullet screen text, the fifth class bullet screen text respectively according to each preset extraction ratio, and then calls the recommended bullet screen function after the extraction, and combines the bullet screen content extracted to form recommended bullet screen text through calculation, that is, the recommended bullet screen text=0.5*the first class bullet screen text+0.2*the second class bullet screen text+0.1*(the third class bullet screen text+the fourth class bullet screen text+the fifth class bullet screen text). For the five classes and the extraction ratios are set based on the current user's viewing habits and preferences, and can be further adjusted and set by the current user according to the actual requirements, therefore, the recommended bullet screen text is easier to be accepted by the current user, compared with the default bullet screen text of the current video, and the recommended bullet screen text is more in line with the current user's own personality.

When the server of the video website extracts the bullet screen content in each preset class according to each preset ratio and forms the recommended bullet screen text that is in line with the current user's viewing habits and preferences, it will send a reminder of playing the recommended bullet screen text to the current user. In order to ensure that the user can enjoy more optimized bullet screen experience, in the present embodiment, the step of the server of the website sending a reminder of playing the recommended bullet screen text to the current user further includes displaying the preview text of the recommended bullet screen text, so as to better help the current user to determine whether the recommended bullet screen text needs to be played or not.

The current user can select playing the recommended bullet screen text or playing the default bullet screen text. After receiving the instruction of playing the recommended bullet screen text confirmed by the current user, the server of the video website further provides a recommended level selection window to the current user, the current user can further adjust the proportion of the recommended bullet screen text in the bullet screen content that will be played actually through the recommended level selection window, and the basis of the server of the video website setting the recommended level is the user's previous bullet screen behavior record, but in order to prevent the recommendation of the bullet screen from fully referring to the user's bullet screen behavior record to enter into a cycle, the recommended level is set to ensure that the user can receive unseen bullet screen comments, the proportional interval received can be set according to the divided levels. Then the current user can further interact with the newly penetrated bullet screen, to collect more behavior data of the user, and then optimize the setting of the preset classes. In this embodiment, the recommended levels include: the first level, the second level, the third level and the fourth level; the playing proportion corresponding to the first level is 40%; the playing proportion corresponding to the second level is 60%; the playing proportion corresponding to the third level is 80%; the playing proportion corresponding to the fourth level is 100%. Based on the above-mentioned recommended levels, the server of the video website can adjust the proportion of the recommended bullet screen text in the bullet screen content that will be played actually according to the current user's selection. When the user selects the first level, the server of the video website determines the proportion of playing the recommended bullet screen text to be 40% according to the first level. At this time, the server of the video website will automatically play 40% of the recommended bullet screen text and 60% of the default bullet screen text.

Therefore, the bullet screen playing control method in this embodiment can recommend the bullet screen text intelligently according to the current user's viewing habits and preferences, and the current user can also further adjust and set the bullet screen text according to the actual requirements on the basis of the automatic recommendation of the server of the video website, so as to ensure the bullet screen content played by the server of the video website can meet different requirements of different users, and bring more optimized and personalized bullet screen experience for each user.

It should be noted that the embodiments of the present invention have better practicality, and do not limit in any form on the present invention, any technician familiar with the field may make use of and change or modify the above-disclosed technical contents to equivalent effective embodiments, any modifications or equivalent changes made to the above embodiments according to the technical essence of the present invention, without departing from the content of the technical solutions of the present invention, are still within the scope of the technical solutions of the present invention.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A computer-implemented method of recommending and presenting comments relative to video frames in a network community, comprising:
    receiving, by a server computing device, a request for playing comments relative to frames of a first video from a first user who is watching the first video;
    classifying, by the server computing device, comments on the first video that have been received from users into a plurality of classifications of comments based on data associated with the users and a plurality of predetermined rules, wherein the plurality of classifications of comments comprise a first classification of comments, a second classification of comments, a third classification of comments, a fourth classification of comments, and a fifth classification of comments;
    obtaining, by the server computing device, a plurality of comments from the plurality of classifications of comments based on a plurality of predetermined proportions corresponding to the plurality of classifications of comments, wherein a sum of the plurality of predetermined proportions is equal to or less than 1;
    generating, by the server computing device, a plurality of recommended bullet screens comprising the plurality of comments obtained from the plurality of classifications of comments; and
    transmitting, by the server computing device, the plurality of recommended bullet screens to the first user, wherein the plurality of comments relative to corresponding frames of the first video are presented to the first user via the plurality of recommended bullet screens.

2. The computer-implemented method of claim 1, wherein the first classification of comments comprises at least a comment on the first video received from at least a second user with whom the first user previously performed at least an interactive operation, the at least an interactive operation comprising at least one of liking, replying, selecting, or copying any comment from the at least a second user by the first user.

3. The computer-implemented method of claim 1, wherein the second classification of comments comprises at least a comment being in a predetermined top N1 percentage (N1%) of comments among the comments on the first video that have received most interactive operations, the interactive operations comprising liking, replying, selecting, or copying any comment on the first video.

4. The computer-implemented method of claim 1, wherein the third classification of comments comprises at least a comment on the first video received from at least a third user who has been followed by the first user.

5. The computer-implemented method of claim 1, wherein the fourth classification of comments comprises at least a comment received from at least a fourth user who has watched one or more same videos as the first user during a predetermined period, and a proportion of the one or more same videos in all videos watched by the at least a fourth user or the first user during the predetermined period is greater than a predetermined N2 percentage (N2%).

6. The computer-implemented method of claim 1, wherein the fifth classification of comments comprises at least a comment received from at least a fifth user whose list of videos of interest or favorite comprises one or more videos belonging to a same genre as the first video, a proportion of the one or more videos belonging to the same genre in all videos included in the list of videos of interest or favorite is greater than a predetermined N3 percentage (N3%).

7. The computer-implemented method of claim 1, further comprising:
    sending, by the server computing device, a first interface to the first user, wherein the first interface comprises a preview of the plurality of comments included in the plurality of recommended bullet screens; and
    determining, by the server computing device, whether to present the plurality of recommended bullet screens to the first user based on an input by the first user via the first interface.

8. The computer-implemented method of claim 7, further comprising:
    sending, by the server computing device, a second interface to the first user in response to a determination that at least one of the plurality of recommended bullet screens is to be presented to the first user, wherein the second interface comprises a plurality of selectable elements that allow the first user to select a recommendation level indicative of a ratio of recommended bullet screens to be displayed relative to a total number of bullet screens to be displayed.

9. The computer-implemented method of claim 8, wherein the recommendation level comprises at least one of a first recommendation level of 40%, a second recommendation level of 60%, a third recommendation level of 80%, and a fourth recommendation level of 100%.

10. A computing system of recommending and presenting comments relative to video frames in a network community, comprising:
    at least a processor; and
    at least a memory communicatively coupled to the at least a processor to configure the at least a processor to:
    receive a request for playing comments relative to frames of a first video from a first user who is watching the first video;
    classify comments on the first video that have been received from users into a plurality of classifications of comments based on data associated with the users and a plurality of predetermined rules, wherein the plurality of classifications of comments comprise a first classification of comments, a second classification of comments, a third classification of comments, a fourth classification of comments, and a fifth classification of comments;
    obtain a plurality of comments from the plurality of classifications of comments based on a plurality of predetermined proportions corresponding to the plurality of classifications of comments, wherein a sum of the plurality of predetermined proportions is equal to or less than 1;
    generate a plurality of recommended bullet screens comprising the plurality of comments obtained from the plurality of classifications of comments; and transmit the plurality of recommended bullet screens to the first user, wherein the plurality of comments relative to corresponding frames of the first video are presented to the first user via the plurality of recommended bullet screens.

11. The computing system of claim 10, wherein the first classification of comments comprises at least a comment on the first video received from at least a second user with whom the first user previously performed at least an interactive operation, the at least an interactive operation comprising at least one of liking, replying, selecting, or copying any comment from the at least a second user by the first user.

12. The computing system of claim 10, wherein the second classification of comments comprises at least a comment being in a predetermined top N1 percentage (N1%) of comments among the comments on the first video that have received most interactive operations, the interactive operations comprising liking, replying, selecting, or copying any comment on the first video.

13. The computing system of claim 10, wherein the third classification of comments comprises at least a comment on the first video received from at least a third user who has been followed by the first user.

14. The computing system of claim 10, wherein the fourth classification of comments comprises at least a comment received from at least a fourth user who has watched one or more same videos as the first user during a predetermined period, and a proportion of the one or more same videos in all videos watched by the at least a fourth user or the first user during the predetermined period is greater than a predetermined N2 percentage (N2%).

15. The computing system of claim 10, wherein the fifth classification of comments comprises at least a comment received from at least a fifth user whose list of videos of interest or favorite comprises one or more videos belonging to a same genre as the first video, a proportion of the one or more videos belonging to the same genre in all videos included in the list of videos of interest or favorite is greater than a predetermined N3 percentage (N3%).

16. The computing system of claim 10, the at least a memory further configuring the at least a processor to:
send a first interface to the first user, wherein the first interface comprises a preview of the plurality of comments included in the plurality of recommended bullet screens; and
determine whether to present the plurality of recommended bullet screens to the first user based on an input by the first user via the first interface.

17. The computing system of claim 16, the at least a memory further configuring the at least a processor to:
send a second interface to the first user in response to a determination that at least one of the plurality of recommended bullet screens is to be presented to the first user, wherein the second interface comprises a plurality of selectable elements that allow the first user to select a recommendation level indicative of a ratio of recommended bullet screens to be displayed relative to a total number of bullet screens to be displayed.

18. A non-transitory computer-readable storage medium bearing computer-readable instructions that upon execution on a computing device cause the computing device at least to:
receive a request for playing comments relative to frames of a first video from a first user who is watching the first video;
classify comments on the first video that have been received from users into a plurality of classifications of comments based on data associated with the users and a plurality of predetermined rules, wherein the plurality of classifications of comments comprise a first classification of comments, a second classification of comments, a third classification of comments, a fourth classification of comments, and a fifth classification of comments;
obtain a plurality of comments from the plurality of classifications of comments based on a plurality of predetermined proportions corresponding to the plurality of classifications of comments, wherein a sum of the plurality of predetermined proportions is equal to or less than 1;
generate a plurality of recommended bullet screens comprising the plurality of comments obtained from the plurality of classifications of comments; and
transmit the plurality of recommended bullet screens to the first user, wherein the plurality of comments relative to corresponding frames of the first video are presented to the first user via the plurality of recommended bullet screens.

19. The non-transitory computer-readable storage medium of claim 18, further bearing computer-readable instructions that upon execution on the computing device cause the computing device at least to:
send a first interface to the first user, wherein the first interface comprises a preview of the plurality of comments included in the plurality of recommended bullet screens; and
determine whether to present the plurality of recommended bullet screens to the first user based on an input by the first user via the first interface.

20. The non-transitory computer-readable storage medium of claim 19, further bearing computer-readable instructions that upon execution on the computing device cause the computing device at least to:
send a second interface to the first user in response to a determination that at least one of the plurality of recommended bullet screens is to be presented to the first user, wherein the second interface comprises a plurality of selectable elements that allow the first user to select a recommendation level indicative of a ratio of recommended bullet screens to be displayed relative to a total number of bullet screens to be displayed.

* * * * *